Patented Jan. 21, 1947

2,414,595

UNITED STATES PATENT OFFICE 2,414,595

METHOD OF PREPARING UNSATURATED NITRO COMPOUNDS

Marvin H. Gold, Chicago, Ill., assignor to The Visking Corporation, Chicago, Ill., a corporation of Virginia No Drawing. Original application May 2, 1944, Serial No. 533,789. Divided and this application June 22, 1946, Serial No. 678,675

3 Claims. (Cl. 260—644)

This invention relates to a process for preparing unsaturated nitro compounds. More particularly, it relates to a continuous process for preparing nitro olefins.

Unsaturated nitro compounds have been prepared heretofore by several methods. One of these methods involves refluxing of the nitro ester in an anhydrous solvent, such as ether or benzene, with an anhydrous alkaline carbonate or bicarbonate for several hours. In such a process the amount of material which can be made in a given period of time is limited. Further, due to prolonged contact with the alkaline carbonate or bicarbonate, a large percentage of the lower molecular weight nitro olefins is polymerized during the period of reaction.

United States Patent 2,257,980 discloses a process of preparing unsaturated nitro compounds by the reaction of alkaline substances, such as alkali metal carbonates, with O-acylated-$\beta$-hydroxy nitro compounds, the alkali metal carbonate being in an amount which is below the stoichiometric amount. This process is also a batch process and a relatively long period of time is required for the completion of the reaction.

United States Patent 2,298,375 discloses a process of producing unsaturated nitro compounds by a one-stage process involving the union of formaldehyde with a nitro hydrocarbon or derivatives with a simultaneous splitting off of water. Though this process is disclosed as being capable of being practiced in a continuous manner, nevertheless the yields are exceedingly small so as to make the process impractical. Additionally, due to the fact that in the reaction a molecule of water is formed for every molecule of nitro olefin, the process is of particular disadvantage in the production of lower nitro olefins since the monomeric nitro olefins, such as, for example, nitro ethylene, are rapidly polymerized in the presence of water.

An object of this invention is to provide a new and improved method for the manufacture of various types of unsaturated nitro compounds.

Another object of this invention is to provide a method of preparing unsaturated nitro compounds which is conducted in a continuous manner and gives consistently high conversions and high yields.

An additional object of this invention is to provide a process for preparing unsaturated nitro compounds under conditions which minimize or indeed inhibit the polymerization thereof.

A further object of this invention is to provide a method for the preparation of unsaturated nitro compounds by the vapor phase pyrolytic cleavage of $\beta$-halogenated nitro compounds in which the carbon atom attached to the nitro group is also attached to at least one hydrogen atom.

A still further object of this invention is to provide a method for the preparation of unsaturated nitro compounds by the vapor phase catalytic cleavage of $\beta$-halogenated nitro compounds in which the carbon atom attached to the nitro group is also attached to at least one hydrogen atom.

A specific object of this invention is the preparation of unsaturated nitro compounds by vapor phase cleavage of $\beta$-halo-nitro alkanes.

Other and additional objects will become apparent hereinafter.

The above objects are accomplished, in general, by subjecting vapors of $\beta$-esters of nitro compounds such as a $\beta$-halo-nitro alkane, in which the carbon attached to the nitro group is also attached to at least one hydrogen atom, to heat to effect pyrolytic cleavage. Though no catalyst is necessary for the performance of the process, if it is desired to lower the reaction temperature whereby the tendency of decomposition to undesirable by-products is materially lessened and to increase the yield of converted material in a single pass, a catalyst may be utilized. When pyrolytic cleavage or catalytic cleavage occurs, due to the nature of the nitro ester employed, the nitro ester is split into an unsaturated nitro compound and the halogen acid corresponding to the halo group. The effluent vapors from the pyrolysis of reaction chamber, either with or without condensation, are fractionated under reduced pressure to separate the lower boiling components (which are the products of the reaction) and the higher boiling components (the unreacted nitro ester). The lower boiling components, which consist of the unsaturated compound (nitro olefin, and the acid, are then, depending on the nature of the nitro olefin, separated in any known manner.

The manner and specific details of practicing the invention will become apparent from the following examples, it being understood that such examples are merely illustrative of several embodiments of the process and are not intended to be limitative thereof:

Example I 19.8 gr. of 1-chloro-2-nitroethane was passed over 100 cc. granulated calcium chloride in a reaction chamber maintained at 250° C. in 25 minutes. Upon distillation of the condensed effluent, there was obtained 3.5 gr. of nitroethylene containing some hydrogen chloride and 13 gr. of starting material. The conversion of chloronitroethane was 26.5% and the yield of nitroethylene based on unrecovered chloronitroethane was 77.5%.

*Example II*

The vapors of 19.5 gr. of 1-chloro-2-nitropropane were passed over 100 cc. of silica gel in a reaction chamber maintained at 325° C. in 22 minutes. Upon distillation of effluent condensate, there was obtained 7 gr. of 2-nitropropene containing some hydrogen chloride and 6 gr. of the chloronitropropane. The conversion of 1-chloro-2-nitropropane was 51% and the yield of 2-nitropropene based on unrecovered chloronitro compound was 73.5%.

In each of the preceding examples, by utilizing the same flow rates and temperature as therein set forth, the respective processes can be performed continuously for periods of several hours with substantially no lowering of the yields or conversions.

The vaporization is effected in any suitable apparatus, from which the vapors are passed into and through the pyrolysis or catalytic reaction chamber. If desired, the vaporization may be effected in the reaction chamber, in which event the nitro ester is passed therethrough at a rate which permits the cleavage in the vapor phase. The reaction chamber is connected to suitable condensers to cool and condense the effluent vapors. Any appropriate apparatus for separating the components of the condensate can be used. Alternatively, the effluent vapors may be conducted from the reaction chamber to a suitable fractionating apparatus whereby the cleaved products are separated from the unreacted nitro ester. The recovered nitro ester is then purified, as by distillation, and recirculated through the pyrolysis chamber.

In the specific examples, certain specific catalysts are disclosed. Though generally mineral salts of the alkaline earth metals have given best results and are therefore preferred, the invention, however, is not restricted to such specific catalysts. As specific illustrative examples of catalysts which can be used in the process may be mentioned alkaline earth salts of mineral acids, such as the chlorides, sulfates or phosphates of calcium, magnesium, strontium and barium; silica gel; aluminum sulfate; aluminum phosphate; and zinc chloride. The aforementioned catalysts can be used singly or in admixture with one or more thereof and may be deposited or impregnated on a solid type of carrier, such as pumice or silica gel.

In order to condition certain of the catalysts, such as calcium phosphate and aluminum sulfate, such materials are subjected to a high temperature, generally red heat or higher, in order to decompose or remove by volatilization any materials which can be so removed. A catalyst which has been so treated is designated as "ignited."

The precise temperature at which the reaction is effected depends on the nitro ester undergoing cleavage and, when a catalyst is used, the type of catalyst. In general, satisfactory results are obtained when the pyrolysis or reaction chamber is maintained at a temperature in the range between 200° C. to 500° C.

Though it is preferred to effect the reaction at atmospheric pressure, it may be conducted at superatmospheric pressure or at reduced pressures, as desired.

The vapors of the nitro esters to be cleaved may be circulated through the cracking chamber, with or without dilution with an inert gas.

Though as shown by the examples certain specific β-halogenated nitro compounds are preferred, the invention is not restricted to such specific nitro esters. In general, the nitro ester which is to be cleaved is a β-halo-nitro alkane having one or more hydrogen atoms attached to the same carbon atom as that to which the nitro group is attached. The β-halo-nitro alkanes which are of use in this invention may be designated by the following formula:

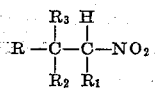

wherein:

$R_1$ is selected from the group consisting of H and alkyl, $R_2$ is selected from the group consisting of H and alkyl, $R_3$ is selected from the group consisting of H and alkyl, and $R_4$ is a halogen selected from the group consisting of chlorine, bromine and iodine.

As is shown by the specific examples and as previously mentioned, the instant invention provides a method of producing unsaturated nitro compounds, such as nitro olefins, in the presence of an inorganic acid. In the case of the lower nitro olefins, such as nitroethylene, this has a very important advantage in that the acid inhibits the tendency of the nitro ethylene to polymerization. Thus, mixtures of the nitro olefin and acid as obtained by the process can be stored for extended periods until ready for use. At that time, the components may be separated from each other and purified in any suitable manner or as hereinbefore described. The instant invention provides a simple continuous method of producing unsaturated nitro compounds, such as nitro olefins, wherein relatively high yields are consistently obtained.

This application is a division of copending application Serial No. 533,789, filed May 2, 1944.

Since it is obvious that various changes and modifications may be made in the above description without departing from the nature or spirit thereof, this invention is not restricted thereto except as set forth in the appended claims.

I claim:

1. A method of preparing unsaturated nitro compounds which comprises vaporizing a β-halo nitro alkane in which the nitro group is attached to the same C atom to which at least one H is attached, and subjecting the resulting vapors to a temperature sufficient to pyrolytically cleave said β-halo nitro alkane into the halogen acid corresponding to the halo group and the nitro olefin.

2. A method of preparing unsaturated nitro compounds which comprises vaporizing a β-halo nitro alkane in which the nitro group is attached to the same C atom to which at least one H is attached, and heating the resulting vapors at a temperature of from 200° C.–500° C. to pyrolytically cleave said β-halo nitro alkane into the halogen acid corresponding to the halo group and the nitro olefin.

3. A process as set forth in claim 2 wherein the β-halo nitro alkane is 1-chloro-2-nitroethane.

MARVIN H. GOLD.

Certificate of Correction

Patent No. 2,414,595.                                                                                     January 21, 1947.

MARVIN H. GOLD

It is hereby certified that errors appear in the printed specification of the above numbered patent requiring correction as follows: Column 3, line 8, for "silica gal" read *silica gel*; column 4, line 11, after "which are" insert *capable*; line 15, in the formula, for "R—" read $R_1$—; and that the said Letters Patent should be read with these corrections therein that the same may conform to the record of the case in the Patent Office.

Signed and sealed this 25th day of March, A. D. 1947.

[SEAL]

LESLIE FRAZER,
*First Assistant Commissioner of Patents.*